United States Patent
Pincemin et al.

(10) Patent No.: US 8,611,746 B2
(45) Date of Patent: Dec. 17, 2013

(54) OPTICAL TRANSMISSION BETWEEN A CENTRAL TERMINAL AND A PLURALITY OF CLIENT TERMINALS VIA AN OPTICAL NETWORK

(75) Inventors: Erwan Pincemin, Gommenec'h (FR); Franck Payoux, Lannion (FR)

(73) Assignee: France Telecom, Paris (FR)

( * ) Notice: Subject to any disclaimer, the term of this patent is extended or adjusted under 35 U.S.C. 154(b) by 913 days.

(21) Appl. No.: 12/087,027

(22) PCT Filed: Dec. 20, 2006

(86) PCT No.: PCT/FR2006/051404
§ 371 (c)(1),
(2), (4) Date: Aug. 14, 2009

(87) PCT Pub. No.: WO2007/074297
PCT Pub. Date: Jul. 5, 2007

(65) Prior Publication Data
US 2010/0221011 A1   Sep. 2, 2010

(30) Foreign Application Priority Data
Dec. 21, 2005   (FR) ...................... 05 13015

(51) Int. Cl.
*H04J 14/02* (2006.01)
*H04J 14/08* (2006.01)
*H04B 10/12* (2011.01)

(52) U.S. Cl.
USPC ................ 398/79; 398/80; 398/146; 398/75; 398/98

(58) Field of Classification Search
USPC .............. 398/70, 71, 75, 98, 79, 80
See application file for complete search history.

(56) References Cited

U.S. PATENT DOCUMENTS

| | | | | |
|---|---|---|---|---|
| 5,786,918 A | * | 7/1998 | Suzuki et al. | 398/98 |
| 5,886,803 A | * | 3/1999 | Yamamoto et al. | 398/41 |
| 7,003,180 B2 | * | 2/2006 | Richardson et al. | 385/1 |
| 7,155,127 B2 | * | 12/2006 | Akimoto et al. | 398/72 |
| 7,224,906 B2 | * | 5/2007 | Cho et al. | 398/183 |
| 7,577,363 B2 | * | 8/2009 | Pincemin | 398/75 |
| 2002/0168161 A1 | * | 11/2002 | Price et al. | 385/123 |
| 2003/0058504 A1 | * | 3/2003 | Cho et al. | 359/161 |

(Continued)

FOREIGN PATENT DOCUMENTS

| | | |
|---|---|---|
| JP | 9-214440 | 8/1997 |
| JP | 2004-048700 | 2/2004 |
| WO | WO 03/090392 A | 10/2003 |

OTHER PUBLICATIONS

D.K. Jung et al., "Spectrum-sliced bidirectional passive optical network for simultaneous transmission of WDM and digital broadcast video signals", Electronic Letters, IEE Stevenage, GB, vol. 37, No. 5, Mar. 1, 2001, pp. 308-309.

*Primary Examiner* — Ken Vanderpuye
*Assistant Examiner* — Abbas H Alagheband
(74) *Attorney, Agent, or Firm* — Knobbe Martens Olson & Bear LLP

(57) ABSTRACT

A system and an associated method of bidirectional optical transmission between a central terminal (101) and a plurality of client terminals (11, 12) via a passive optical network (PON) (3), wherein the conversion of an OTDM signal into a WDM signal (respectively the conversion of a WDM signal into an OTDM signal) is effected by an optical converter (20) (respectively 21) by a soliton trapping effect during a downlink (respectively uplink) transmission stage.

14 Claims, 4 Drawing Sheets

(56) References Cited

U.S. PATENT DOCUMENTS

| | | | |
|---|---|---|---|
| 2003/0190167 A1* | 10/2003 | Simon et al. | 398/97 |
| 2003/0231885 A1* | 12/2003 | Kato et al. | 398/98 |
| 2004/0141748 A1* | 7/2004 | Spickermann et al. | 398/72 |
| 2005/0226623 A1* | 10/2005 | Pincemin | 398/98 |
| 2009/0052906 A1* | 2/2009 | Pincemin et al. | 398/182 |

* cited by examiner

OPTICAL TRANSMISSION BETWEEN A CENTRAL TERMINAL AND A PLURALITY OF CLIENT TERMINALS VIA AN OPTICAL NETWORK

RELATED APPLICATIONS

This is a U.S. National Phase Application under 35 USC 371 of International Application No. PCT/FR2006/051404, filed on 20 Dec. 2006.

This patent application claims priority of French patent application No. 0513015 filed 21 Dec. 2005, the disclosure content of which is hereby incorporated by reference.

TECHNICAL FIELD OF THE INVENTION

The field of the invention is that of access networks that take the form of passive optical networks (PON). The invention is more particularly concerned with very high bit rate optical transmission systems linking a central terminal and a plurality of client terminals via an access passive optical network.

BACKGROUND OF THE INVENTION

At present, the access networks of most telecommunications operators use cable, access technologies such as ADSL (Asymmetrical Digital Subscriber Line). Optical technologies are currently very little used access networks because the infrastructure cost as generated in particular by installing optical fibers between central offices and subscribers, is still prohibitive.

However, the use of optical technologies in access networks based on passive optical network architectures represents a significant step forward in terms of capacity, impossible to achieve with cable access technologies, but nevertheless inevitable given the increasing bit rates of services aimed at the subscriber.

Generally speaking, access networks in the form of passive optical networks can be of two types, standard passive optical networks and wavelength division multiplex (WDM) passive optical networks.

Standard passive optical networks use time division multiple access (TDMA) and require only one transmitter at the central office. They are based on using 1×N optical couplers (where N is a number of clients or subscribers) to distribute all the time division multiplexed data stream to the N clients. The information carried by a signal transmitted by the central office is then transmitted to all subscribers, and dedicated terminals on each subscriber premises extract the information intended for that subscriber. Thus data transmitted by the central office on a single wavelength is time division demultiplexed in each of the client terminals disposed on the subscriber premises.

However, the client terminal is complex and the attenuation of the signal by a 1×N coupler is non-negligible. Moreover, the fact that the information is extracted in each client terminal represents a security issue.

WDM passive optical networks use wavelength division of resources. In other words, each client is allocated a specific wavelength by the central office. Each wavelength is filtered in an optical demultiplexer and transmitted to the corresponding subscriber. That type of network therefore requires the use of a multiplex comprising a number of wavelengths equal to the number of subscribers and a demultiplexer.

A WDM passive optical network therefore has the advantages over a standard passive optical network of simplicity, each wavelength being assigned to a specific subscriber, and of performance, an optical demultiplexer causing significantly less attenuation than a 1×N coupler.

In contrast, because it uses more wavelengths and a routing component (an optical demultiplexer) that is more costly than a simple 1×N coupler, it is more costly.

There is also known a central office including a tunable laser that can emit a number of different wavelengths. It therefore transmits to clients one after the other by tuning the wavelength it transmits. However, the tunable laser must operate at a bit rate N times greater than that allocated to clients, and a switching time of 50 ns must be added, in the best case scenario, which is far from negligible with bit rate communications.

OBJECTS AND SUMMARY OF THE INVENTION

Objects of the invention are to eliminate those drawbacks and to simplify optical transmission between a central terminal and a plurality of client terminals.

The above objects are achieved by a method of optical transmission between a central terminal and a plurality of client terminals via an optical network wherein downlink data $D_1, D_2$ is transmitted from the central terminal to the plurality of client terminals during a downlink transmission stage and uplink data $D'_1, D'_2$ is transmitted from the plurality of client terminals to a central terminal during an uplink transmission stage.

According to the present invention the downlink transmission stage comprises the following steps:

the central terminal transmitting downlink optical signal S multiplexed in both amplitude and time at a single wavelength and carrying the downlink data $D_1, D_2$ to be received by the plurality of client terminals, the downlink optical signal at a single wavelength consisting of soliton pulses having a plurality of amplitudes $A_1, A_2$;

using a non-linear soliton trapping effect to convert the single wavelength of the downlink optical signal into a plurality of wavelengths $\lambda_1, \lambda_2$ as a function of the plurality of amplitudes $A_1, A_2$ to form a wavelength division multiplexed downlink optical signal $S_f$;

routing the wavelength division multiplexed downlink optical signal $S_f$ to the plurality of client terminals; and wavelength division demultiplexing the wavelength division multiplexed downlink optical signal $S_f$ so that each client terminal receives the data $D_1, D_2$ intended for it at a specific wavelength $\lambda_1, \lambda_2$.

According to an embodiment of the present invention, the uplink transmission stage comprises the following steps:

transmitting a plurality of uplink optical signals $S'_1, S'_2$ to the central terminal, each uplink optical signal carrying the respective uplink data $D'_1, D'_2$ at a different wavelength $\lambda'_1, \lambda'_2$ and being transmitted by a respective client terminal from the plurality of client terminals with a specific amplitude $A'_1, A'_2$ and a predetermined time shift $t'_1, t'_2$;

wavelength division multiplexing the plurality of uplink optical signals $S'_1, S'_2$ to form a wavelength division multiplexed uplink optical signal $S'_f$; and routing the wavelength division multiplexed uplink optical signal $S'_f$ to one or more receivers for receiving the data $D'_1, D'_2$ transmitted by each client terminal of the plurality of client terminals.

Thus the soliton trapping effect during the conversion step converts an optical signal multiplexed in both amplitude and time at a single wavelength transmitted by the central terminal into a wavelength division multiplexed optical signal including a plurality of wavelengths so that each wavelength carries data specific to each client terminal. This conversion process is particularly suitable for converting very high bit rate optical signals. Below the expression "very high bit rate" refers to bit rates of the order of 40 giga bits per second (Gbps) to 160 Gbps.

The method of the invention therefore reduces the costs of passive optical transmission networks (compared to current WDM passive optical networks) and enhances performance, especially in terms of transmission bit rate, security, and the simplicity of the transmission network.

The uplink transmission stage of a first implementation of the optical transmission method of the invention further comprises:
  a wavelength division demultiplexing step in which the wavelength division multiplexed uplink optical signal $S'_f$ is spectrally demultiplexed into a plurality of spectral components; and
  a step of reception of the uplink data by a plurality of receivers during which each of the spectral components carrying uplink data transmitted by a client terminal on a respective wavelength is received by a receiver from the plurality of receivers.

The uplink transmission stage of a second embodiment of the optical transmission method of the invention further comprises:
  a conversion step during which the wavelength division multiplexed uplink optical signal $S'_f$ is converted by a non-linear soliton trapping effect into a time division multiplexed uplink signal at a single wavelength $\lambda'_0$ carrying the uplink data; and
  a step of a single receiver receiving the uplink signal at a single wavelength $\lambda'_0$.

A method according to an embodiment of the invention simultaneously effects the conversion by the soliton trapping effect of an OTDM signal (transmitted by the central terminal) into a WDM signal (transmitted to the plurality of client terminals) and the reciprocal conversion of a WDM signal (coming from the plurality of client terminals) into an OTDM signal (transmitted to the central terminal). Such a method combines the advantage of TDM transmission with the advantages of WDM transmission.

The uplink data $D'_1$, $D'_2$ is advantageously recovered using a single receiver in the central terminal, thus minimizing the overall size of the central terminal.

According to one feature in an embodiment of the invention, the method comprises a step of temporal compression of the soliton pulses before the conversion step.

This step of compressing soliton pulses in the time domain increases the peak power of the pulses, thus enhancing excitation by the nonlinear soliton trapping effect.

According to another feature in an embodiment of the invention, during the downlink transmission stage of the optical transmission method, the step of conversion by the non-linear soliton trapping effect is effected by injecting the downlink optical signal S at a single wavelength $\lambda_0$ at 45° to the proper axes of a polarization-maintaining birefringent fiber.

This optimizes trapping of soliton pulses in the time domain.

According to another feature in an embodiment of the invention, during the uplink transmission stage during the downlink transmission stage of the optical transmission method the step of conversion by the non-linear soliton trapping effect is effected by injecting said wavelength division multiplexed uplink optical signal $S'_f$ at 45° to the proper axes of a polarization-maintaining birefringent fiber.

According to another feature in an embodiment of the invention, the wavelength division multiplexed signal is extracted on one of the proper axes of the polarization-maintaining birefringent fiber.

Because of the birefringence of the fiber, any incident pulse is duplicated in two proper propagation modes, each mode propagating on one of the proper axes of the polarization-maintaining fiber. For example, by placing a polarizer oriented on one of the proper axes of the fiber, it is possible to recover one of the two proper modes of the spectrum and consequently one of the frequency components generated by the soliton trapping effect carried by one of the proper axes of the fiber.

Another aspect of the invention is directed to an optical transmission system linking a central terminal and a plurality of client terminals via an optical network, the central terminal being adapted to transmit downlink data $D_1$, $D_2$ on a downlink to the plurality of client terminals and to receive uplink data $D'_1$, $D'_2$ on an uplink from the plurality of client terminals.

The system according to the invention comprises on the downlink:
  means for transmitting an uplink optical signal S at a single wavelength $\lambda_0$ and carrying the downlink data $D_1$, $D_2$, the downlink optical signal S being multiplexed in both time and amplitude and consisting of soliton pulses having a plurality of amplitudes $A_1$, $A_2$;
  non-linear means for converting by a soliton trapping effect the single wavelength $\lambda_0$ of the downlink optical signal S into a plurality of wavelengths $\lambda_1$, $\lambda_2$ as a function of the plurality of amplitudes $A_1$, $A_2$ to form a wavelength division multiplexed downlink optical signal $S_f$;
  routing means for routing the wavelength division multiplexed downlink optical signal $S_f$ to the plurality of client terminals; and
  first demultiplexing means for spectrally demultiplexing the downlink optical signal $S_f$ so that each client terminal receives the downlink data $D_1$, $D_2$ for it on a specific wavelength $\lambda_1$, $\lambda_2$.

A system according to an embodiment of the invention comprises on the uplink:
  means for transmitting a plurality of uplink optical signals $S'_1$, $S'_2$ to the central terminal, each uplink optical signal carrying the respective uplink data $D'_1$, $D'_2$ at a different wavelength $\lambda'_1$, $\lambda'_2$ and being transmitted by a respective client terminal of the plurality of client terminals with a specific amplitude $A'_1$, $A'_2$ and with a predetermined time shift $t'_1$, $t'_2$;
  multiplexing means for wavelength division multiplexing the plurality of uplink optical signals $S'_1$, $S'_2$ to form a wavelength division multiplexed uplink optical signal $S'_f$;
  means for routing the wavelength division multiplexed uplink optical signal $S'_f$; and
  one or more receivers for receiving the data $D'_1$, $D'_2$ transmitted by each client terminal of the plurality of client terminals.

The architecture of the bidirectional system according to an embodiment of the invention is therefore very simple to implement and can operate at very high transmission bit rates (from 40 Gbps to 160 Gbps). On the downlink, the central terminal transmits downlink data on a single wavelength.

Moreover, the system offers optimum security and good performance because it associates a specific wavelength with each client terminal. In this way, in contrast to standard passive optical networks, each client terminal receives, on a specific wavelength, only data that is intended for it.

A first embodiment of the system of the invention further comprises on the uplink:
  second demultiplexing means for spectrally demultiplexing the wavelength division multiplexed uplink optical signal $S'_f$ into a plurality of spectral components; and
  a plurality of receivers at the output of the second demultiplexing means each adapted to receive uplink data carried by each spectral component and transmitted by a client terminal on a respective wavelength.

A second embodiment of the system of the invention further comprises on the uplink:
  non-linear means for converting by a soliton trapping effect the wavelength division multiplexed uplink optical signal $S'_f$ into a time division multiplexed uplink signal at a single wavelength $\lambda'_0$ carrying the uplink data; and
  means for receiving the uplink signal at a single wavelength $\lambda'_0$.

According to another feature in an embodiment of the invention, the system further comprises temporal compression means upstream of the non-linear means for compressing the soliton pulses.

According to another feature in an embodiment of the present invention the temporal compression means consist of a non-linear compression chalcogenide glass fiber.

Using an all-optical component such as a chalcogenide glass optical fiber has the advantage of compressing soliton pulses in the time domain, dispensing with an active component.

Moreover, with regard to temporal compression, a chalcogenide glass fiber has the advantage of a much higher non-linear index than a standard glass fiber. Thus non-linear compression of pulses in the time domain can be more easily achieved with this type of fiber than with a standard fiber, thereby limiting the overall size of the temporal compression means and the power required to exacerbate the compression effect.

According to another feature in an embodiment of the invention, the non-linear means consist of a polarization-maintaining birefringent fiber having two different proper axes.

With a polarization-maintaining birefringent fiber, the length of fiber necessary to produce wavelength shifting by the soliton trapping effect is advantageously negligible.

According to another feature in an embodiment of the invention, the system further comprises means for extracting the wavelength division multiplexed downlink optical signal on one of the proper axes of the birefringent fiber, said means being selected from the following:
  a polarizer;
  a band-pass optical filter.

According to another feature in an embodiment of the invention, the optical network is an access passive optical network.

Given that the system of the invention described requires no active component, in particular for conversion from both time and amplitude division multiplexing to wavelength division multiplexing, this type of optical transmission network is particularly suitable for a passive optical network which, by definition, does not use active components to route signals.

The invention is also directed to an optical transmission central terminal comprising:
  a transmitter for transmitting downlink data $D_1$, $D_2$ to a plurality of client terminals, the downlink data being carried by a downlink optical signal S at a single wavelength $\lambda_0$ comprising a plurality of soliton pulses, the downlink optical signal S being both time and amplitude division multiplexed and having a plurality of amplitudes $A_1$, $A_2$; and
  one or more receivers for receiving uplink data $D'_1$, $D'_2$ transmitted by the plurality of client terminals.

The terminal of the invention is characterized in that it further comprises:
  routing means for routing downlink and uplink data; and
  a first optical converter between the transmitter and the routing means and comprising non-linear means for converting by a soliton trapping effect a single wavelength $\lambda_0$ of the downlink optical signal S into a plurality of wavelengths $\lambda_1$, $\lambda_2$ as a function of the plurality of amplitudes $A_1$, $A_2$ so as to form a wavelength division multiplexed downlink optical signal $S_f$.

The architecture of the equipment has the advantage of being very simple because a single transmitter to transmit an optical signal both amplitude and time division multiplexed at a single wavelength and an optical converter for obtaining a wavelength division multiplexed signal are sufficient.

By means of the routing means, a downlink data stream transmitted by the central terminal is routed to the plurality of client terminals, while an uplink data stream transmitted by the client terminals is routed to one or more data receivers of the central terminal. These routing means (for example an optical circulator) therefore have the advantage of making the central terminal a "full duplex" terminal in the sense that the central terminal can transmit and receive data simultaneously.

This solution has the advantage that the uplink and the downlink share the same network infrastructure, thus minimizing the complexity and overall cost of the transmission system.

A first embodiment of the central terminal of the invention comprises a receive demultiplexer and a plurality of receivers for receiving the uplink data $D'_1$, $D'_2$, each of the receivers being connected to the receive demultiplexer, and the routing means are disposed between the first non-linear means and the receive demultiplexer.

A second embodiment of the central terminal of the invention further comprises a data receiver and a second optical converter located between the routing means and the data receiver and comprising non-linear means.

This second embodiment has the advantage of using only one receiver in the central terminal.

Another aspect of the invention is directed to an optical transmission client terminal including a transceiver for transmitting or receiving data carried by an optical signal having a specific wavelength from or to a central terminal having the above features.

Because it is not necessary for it to include dedicated means for extracting data intended for it, the client terminal is highly secure and of great simplicity.

BRIEF DESCRIPTION OF THE DRAWINGS

Other features and advantages of the invention emerge from a reading of the description given below by way of nonlimiting example and with reference to the appended drawings, in which.

DETAILED DESCRIPTION OF EMBODIMENTS

Figure 1:
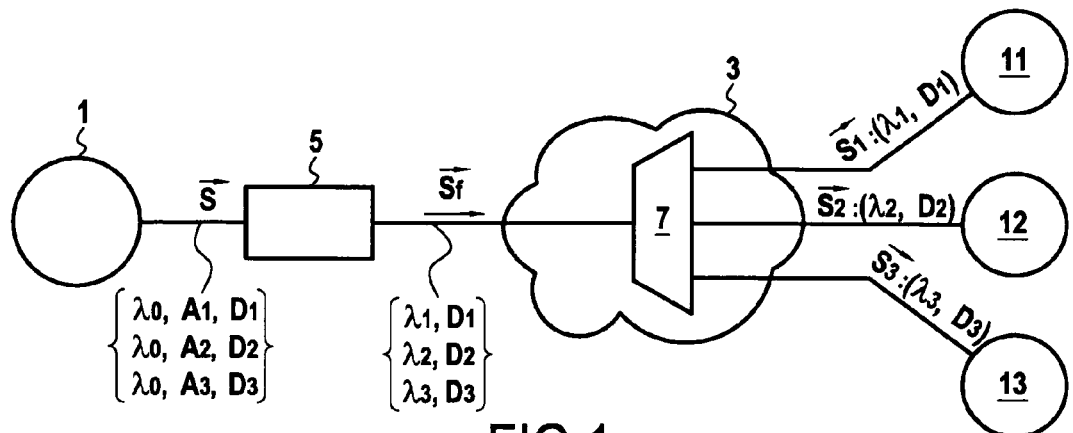
FIG. 1 shows a schematic example of an optical transmission system linking a central terminal and a plurality of client terminals via an optical network and including non-linear means of the invention.

FIG. 1 represents, by way of example and highly diagrammatically, an optical transmission system linking a central terminal 1 and a plurality of client terminals (three client terminals 11, 12, 13 in FIG. 1) via an optical network 3, the system comprising non-linear means 5 according to the invention.

In this example, the central terminal 1 transmits downlink data ($D_1$, $D_2$, $D_3$) carried by an amplitude and time multiplexed downlink optical signal S at a single wavelength $\lambda_0$ and having a plurality of amplitudes ($A_1$, $A_2$, $A_3$).

The transmission system comprises non-linear means 5 and a wavelength division demultiplexer 7 (first demultiplexing means), this demultiplexer 7 being part of the optical network 3.

The non-linear means 5 convert the amplitude and time multiplexed downlink optical signal S at the single wavelength $\lambda_0$ into a downlink wavelength division multiplexed optical signal $S_f$ including a plurality of spectral components $S_1$, $S_2$, $S_3$ at a plurality of wavelengths ($\lambda_0 \pm \Delta\lambda_1$, $\lambda_0 \pm \Delta\lambda_2$, $\lambda_0 \pm \Delta\lambda_3$). For example, the spectral component of $S_1$ of wavelength $\lambda_1 = \lambda_0 \pm \Delta\lambda_1$ carries data $D_1$ for the client terminal 11.

The wavelength division demultiplexer 7 between the non-linear means 5 and the client terminals 11, 12, 13 wavelength division demultiplexes the signal $S_f$, spatially distributing the plurality of spectral components ($S_1$, $S_2$, $S_3$) at the plurality of wavelengths so that each client terminal receives only data intended for it. For example, the client terminal 12 receives data $D_2$ carried by the signal $S_2$ at the wavelength $\lambda_2 = \lambda_0 \pm \Delta\lambda_2$.

Figure 2A:
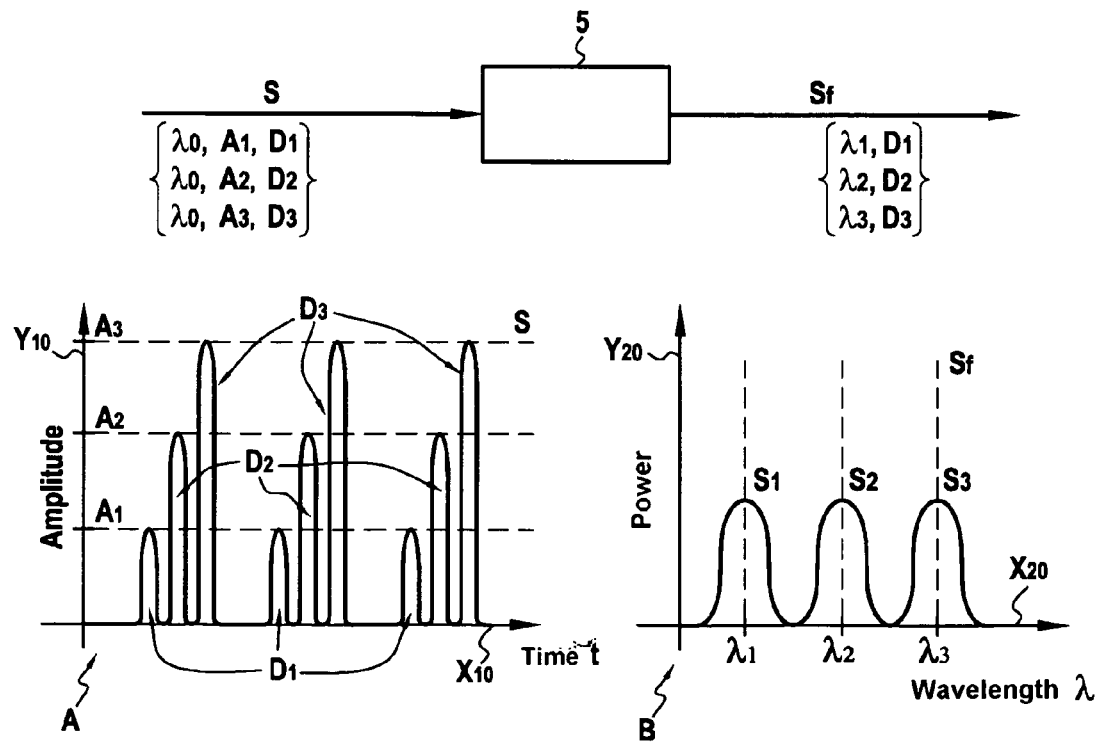
FIGS. 2A and 2B show the theory of operation of the non-linear means from FIG. 1.
Figure 2B:
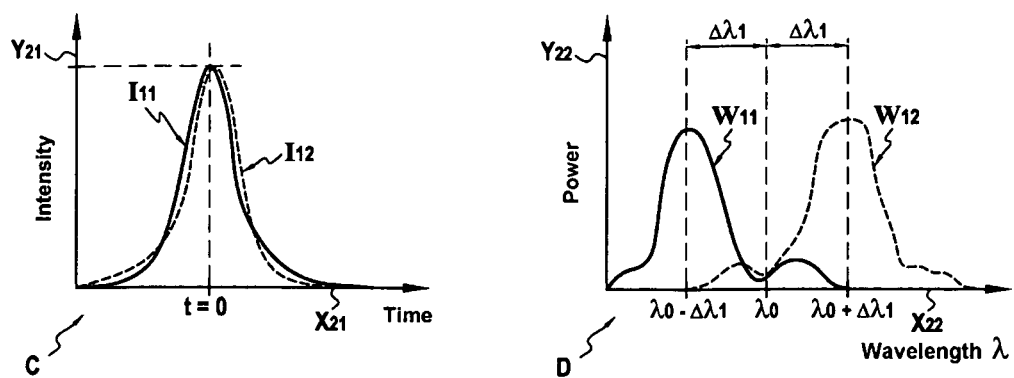

FIGS. 2A and 2B illustrate the operating principle of the non-linear means 5 from FIG. 1.

The non-linear means 5 convert the optical signal S multiplexed in both amplitude and time at the single wavelength $\lambda_0$ into a wavelength division multiplexed optical signal $S_f$.

As shown in diagram A in FIG. 2A, the optical signal S consists of a sequence of soliton pulses with different amplitudes (denoted $A_1$, $A_2$, $A_3$ on the ordinate axis Y10) distributed in time (on the abscissa axis X10). For example, downlink data $D_3$ to be received by the client terminal 13 at the wavelength $\lambda_3 = \lambda_0 \pm \Delta\lambda_3$ is represented by the pulses of the same amplitude $A_3$.

By the soliton trapping effect, all pulses having the same amplitude (or power) are subject to the same frequency shift (or wavelength shift) as a function of their amplitude, so that the initial wavelength $\lambda_0$ of these pulses is converted into specific wavelengths ($\lambda_1 = \lambda_0 \pm \Delta\lambda_1$, $\lambda_2 = \lambda_0 \pm \Delta\lambda_2$, or $\lambda_3 = \lambda_0 \pm \Delta\lambda_3$ in this example). For example, a set of pulses entering the non-linear means 5 at the wavelength $\lambda_0$ with an amplitude $A_2$ are converted into a set of pulses at wavelengths $\lambda_2 = \lambda_0 \pm \Delta\lambda_2$ diagrammatically represented by the optical signal $S_2$.

Thus the non-linear means 5 supply as output the wavelength division multiplexed optical signal $S_f$, only half the spectrum of which is diagrammatically represented in diagram B in FIG. 2A. In this example, the spectrum of the signal $S_f$ is represented by only three spectral components $S_1$, $S_2$, $S_3$ whose amplitudes are represented on the ordinate axis Y20 as a function of their wavelength on the abscissa axis X20.

During the soliton trapping effect conversion step, the pulses of amplitude $A_3$ and wavelength $\lambda_0$ carrying data $D_3$ for the client terminal 13 are converted into an optical signal $S_3$ of wavelength $\lambda_3 = \lambda_0 \pm \Delta\lambda_3$ intended only for the client terminal 13.

Note that the wavelength shift produced by the non-linear means 5 is proportional to the peak power of the soliton pulses. In other words, $\Delta\lambda_3$ is directly proportional to the amplitude $A_3$.

FIG. 2B is a highly diagrammatic representation of the phenomenon of soliton trapping in a polarization-maintaining birefringent fiber 5 when a soliton pulse of amplitude $A_1$ is injected into the fiber at 45° to the proper axes of the fiber.

Because of the birefringence of the fiber 5, this incident pulse is duplicated in two propagation modes on the two proper axes of the birefringent fiber 5. One of the modes is propagated on the fast axis and the other mode is propagated on the slow axis. Given that the polarization of the incident pulse is oriented at 45° to the proper axes of the fiber, this pulse is divided into two replicas of equal amplitude.

Diagrams C and D in FIG. 2B respectively represent the temporal profile and the spectrum of soliton pulses of amplitude $A_1$ that have been subjected to the soliton trapping effect after being injected into the fiber 5 so that the polarization of the initial pulse is oriented at 45° to the proper axes of the fiber 5.

In these diagrams C and D, the profiles in dashed line correspond to the mode propagating on the fast axis of the polarization-maintaining birefringent fiber 5 and the profiles in solid line correspond to the mode propagating on the slow axis of the fiber 5.

Because of the soliton trapping effect, in the time domain, the two proper modes of the pulse denoted $I_{11}$ and $I_{12}$ are trapped around the time denoted t=0 on the abscissa axis $X_{21}$. This soliton trapping effect is represented in diagram C in FIG. 2B by the almost complete superposition of the soliton modes $I_{11}$ and $I_{12}$.

However, in the frequency domain, the non-linear soliton trapping effect divides the spectrum of the soliton pulse of amplitude $A_1$ at center wavelength $\lambda_0$ into two spectral components $W_{11}$ and $W_{12}$ symmetrical relative to the center wavelength $\lambda_0$ of the incident pulse, as represented in diagram D in FIG. 2B.

In that diagram, the absolute value of the wavelength shift produced by the non-linear soliton trapping effect is denoted $\Delta\lambda_1$. Thus the spectral component $W_{11}$ is at the wavelength $\lambda_0 - \Delta\lambda_1$ and the spectral component $W_{12}$ is at the wavelength $\lambda_0 + \Delta\lambda_1$. The spectral shift of the two components $W_{11}$, $W_{12}$ relative to the wavelength $\lambda_0$ of the emitted pulse is directly proportional to the amplitude $A_1$ of the initial pulse and consequently to the magnitude of the soliton trapping effect.

Accordingly, as a general rule, the polarization-maintaining birefringent fiber 5 converts the initial wavelength $\lambda_0$ of a soliton pulse of amplitude $A_n$ (where n=1, 2 or 3 in this example) into two different wavelengths $\lambda_0 + \Delta\lambda_n$ and $\lambda_0 - \Delta\lambda_n$, where $\Delta\lambda_n$ is the spectral shift associated with the amplitude $A_n$, these two wavelengths being symmetrical relative to the wavelength $\lambda_0$.

Figure 3:
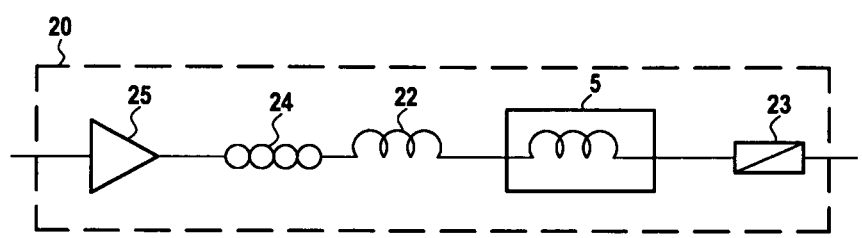
FIG. 3 shows one embodiment of an optical converter of the invention.

FIG. 3 shows one embodiment of the converter 20 of the invention.

This embodiment of the converter 20 includes a polarization-maintaining birefringent fiber 5 (constituting the non-linear means 5), a soliton pulse temporal compression fiber 22 (constituting the compression means 22), a polarizer 23 (constituting the polarization extraction means 23), and a polarization controller 24.

In FIG. 2B the two spectral components $W_{11}$ and $W_{12}$ generated by the polarization-maintaining birefringent fiber 5 carry the same information. Consequently, it suffices to recover only one of those spectral components ($W_{11}$ or $W_{12}$) at the output of the non-linear means 5. For example, a polarizer 23 can be placed on one of the proper axes of the polarization-maintaining fiber 5. The same effect can be achieved by means of a band-pass optical filter 23' whose center wavelength corresponds to the wavelength of one of the components $W_{11}$, $W_{12}$.

The polarization controller 24 controls the polarization state of the pulses in order to be sure that the pulses are injected into the polarization-maintaining birefringent fiber 5 with a polarization oriented at 45° to the proper axes of the fiber 5.

In another embodiment, the optical converter 20 can also include an optical amplifier 25.

A numerical example is given below to show how the converter 20 wavelength division demultiplexes the multiplexed optical signal S at a total bit rate of 40 Gbps.

For example, consider a stream of data at a bit rate of 40 Gbps transmitted by the central terminal 1 and comprising pulses having a temporal width $\tau$ equal to 1 ps and a single wavelength $\lambda_0$ equal to 1550 nm.

Also, consider compression means 22 consisting of a chalcogenide glass fiber element having a non-linear index $n_2$ equal to $2.10^{-18}$ m²/W and an effective area $A_{\mathit{eff}}$ equal to 50 µm². Note that the non-linear index $n_2$ of the chalcogenide glass fiber 22 is much higher than that of a standard glass fiber. Moreover, a chromatic dispersion D equal to 5 ps/nm/km can be chosen for this chalcogenide glass fiber 22.

Remember that in an optical fiber, non-linear compression of soliton pulses in the time domain is possible if the power of the soliton pulses introduced into the fiber is greater than the power $P_0$ of the fundamental soliton.

There follows a description of the calculation of the peak power of a soliton pulse of order N=6 required to obtain a compression factor of approximately 25 in the compression fiber 22.

The dispersion length $Z_D$ of the soliton is given by the following equation, in which c is the velocity of light in a vacuum:

$$Z_D = \frac{2\pi c \cdot \tau^2}{1.763^2 \lambda^2 D} \tag{1}$$

Using the above data, the dispersion length $Z_D$ is therefore equal to 50.5 m. The soliton period $Z_0$ is given by the equation:

$$Z_0 = \frac{\pi Z_D}{2} \tag{2}$$

In this example, the soliton period $Z_0$ is equal to 79.3 m. The peak power $P_0$ of the fundamental soliton then has the value:

$$P_0 = \frac{0.776 \lambda^3 A_{\mathit{eff}} D}{\pi^2 c n_2 \tau^2} \tag{3}$$

In this example, the peak power $P_0$ has a value of 123 mW. Thus the mean power of the corresponding stream of pulses is equal to 4.4 dBm.

Furthermore, the dispersion length $L_D$ and the non-linear length $L_{NL}$ corresponding to the propagation of a pulse of width 1 ps and of peak power $P_C$ in the non-linear chalcogenide glass fiber 22 (constituting the compression means 22) are given by the following equation:

$$L_D = \frac{2\pi c \cdot \tau^2}{\lambda^2 D} \tag{4}$$

$$L_{NL} = \frac{\lambda A_{\mathit{eff}}}{2\pi n_2 P_C}$$

Note that the pulses can be considered as very close to $N^{th}$ order solitons if their peak power $P_C$ satisfies the following relation:

$$N^2 = \frac{L_D}{L_{NL}} = \frac{4\pi^2 n_2 c \tau^2 P_C}{\lambda^3 D A_{\mathit{eff}}} \Rightarrow P_C = \frac{\lambda^3 D A_{\mathit{eff}} N^2}{4\pi^2 n_2 c \tau^2} \tag{5}$$

For example, for a soliton of order N=6, the corresponding peak power $P_C$ has the value 1.41 mW.

$$N=6 \Rightarrow P_C = 1.41 \text{ W} \tag{6}$$

The compression factor $F_C$ of the pulses with the peak powers calculated above on injecting those pulses into the compression fiber 22 is then given by the equation:

$$F_C = 4.1 N \tag{7}$$

The fiber length $L_{opt}$ necessary to obtain this compression is then:

$$L_{opt} = \left[\frac{0.32}{N} + \frac{1.1}{N^2}\right] \cdot Z_0 \tag{8}$$

i.e., for N=6:

$$N=6 \Rightarrow F_C = 24.6 \text{ and } L_{opt} = 6.65 \text{ m} \tag{9}$$

The compression factor is therefore approximately 25 (the width of the pulses after compression is 40 fs) and the length of chalcogenide glass fiber 22 necessary to obtain that compression is 6.65 m.

This stage of compressing the pulses in the time domain is followed by spectral shifting of the pulses by the soliton trapping effect.

For example, this non-linear effect is produced in a polarization-maintaining fiber 5 with soliton pulses having polarization that is oriented at 45° to the proper axes of that fiber 5.

Note that the soliton trapping effect can be obtained if the following two conditions are satisfied.

The first condition is that the polarization-maintaining fiber 5 (constituting the non-linear means 5) must be used in a non-linear regime, i.e. the incident pulses must have the physical characteristics (amplitude and half-amplitude width) of solitons, preferably first order solitons, suited to said polarization-maintaining fiber 5. Note that the soliton trapping effect works best on first order solitons.

The second condition is that the "walk-off" of the soliton pulses (in other words the duration of the collision of the two soliton pulses with orthogonal polarizations subject to the polarization mode dispersion of the polarization-maintaining fiber 5) propagating in the polarization-maintaining fiber 5 must be less than or equal, after one soliton period, to the width of the pulses before injection into the polarization-maintaining fiber 5 (here this width is $\tau_0 = 40$ fs).

M. N. Islam et al. define the "walk-off" by the following equation, in which $\Delta\beta'$ is the polarization mode dispersion of the polarization-maintaining fiber 5:

$$\text{Walk-Off} = \Delta\beta' \cdot Z_0 \leq \tau_0 \quad (10)$$

Consider now non-linear means 5 consisting of a chalcogenide polarization-maintaining glass fiber with a non-linear index $n_2$ equal to $2.10^{-18}$ m$^2$/W, an effective area $A_{eff}$ equal to 50 µm$^2$, and a chromatic dispersion equal to 5 ps/nm/km, for which the soliton period $Z_0$ has the value:

$$Z_0 = \frac{\pi^2 c \cdot \tau_0^2}{1.763^2 \lambda^2 D} = 12.7 \text{ cm} \quad (11)$$

The peak power $P_0$ of the fundamental soliton then has the value:

$$P_0 = \frac{0.766 \lambda^3 A_{eff} D}{\pi^2 c n_2 \tau_0^2} = 76 \text{ W} \quad (12)$$

i.e. a mean power of the corresponding stream of pulses equal to 18.4 dBm. Equation (10) indicates that the polarization mode dispersion must be less than or equal to 315 ps/km.

The soliton trapping parameter δ as defined by M. N. Islam, C. D. Poole, J. P. Gordon in a paper entitled "Soliton Trapping in birefringent optical fibers", Optics Letters, Vol. 14, No. 18, pp. 1011-1013, September 1989, is given by the following formula, in which $\Delta n$ is the index variation between the proper birefringence axes of the polarization-maintaining fiber:

$$\delta = \frac{\pi \Delta n \tau_0}{1.763 \lambda^2 D} \quad (13)$$

Because the polarization mode dispersion $\Delta\beta'$ is related to $\Delta n$ by the following equation:

$$\Delta\beta' = \frac{\Delta n}{c} \quad (14)$$

equation 13 then becomes:

$$\delta = \frac{\pi c \Delta\beta' \tau_0}{1.763 \lambda^2 D} \quad (15)$$

According to C. R. Menyuck in the paper entitled "Stability of solitons in birefringent optical fibers. I: Equal propagation amplitudes", Optics Letters, Vol. 12, No. 8, pp. 614-616, August 1987, the birefringence of the polarization-maintaining fiber is compensated by the Kerr effect for a first order soliton if the parameter δ is equal to 0.5, thus:

$$\Delta\beta' = \frac{1.763 \lambda^2 D \delta}{\pi c \tau_0} = 281 \text{ ps/km} \quad (16)$$

With this value of $\Delta\beta'$, the "walk-off" is equal to 35.7 fs. This value being less than the width of the initial pulses (40 fs), the conditions for the soliton trapping effect to exist are clearly satisfied. The birefringence of the fiber is then equal to:

$$\Delta n = c \Delta\beta' = 8.4 \cdot 10^{-5} \quad (17)$$

i.e. a beat length $L_B$ of approximately 18 mm (compared to the beat length of 3 mm of very strongly birefringent fibers).

To summarize, by injecting a first order soliton of mean power equal to 18.4 dBm at 45° to the proper axes of a chalcogenide polarization-maintaining birefringent glass fiber for which $\Delta n = 8.4 \cdot 10^{-5}$, the chromatic dispersion D=5 ps/nm/km, the non-linear index $n_2 = 2.10^{-18}$ m$^2$/W, the effective area $A_{eff} = 50$ µm$^2$, all the soliton trapping excitation conditions are satisfied.

As disclosed by G. P. Agrawal in "Nonlinear Fiber Optics", p. 164-165, Academic Press, 1989, the pulses are caused to propagate over a distance of 1.3 m, which corresponds to approximately 10·$Z_0$. The wavelength shift $\Delta\lambda$ generated between the two replicas $W_{12}$ and $W_{11}$ of the spectrum of the pulse from FIG. 2B is then given by the equation:

$$\Delta\lambda = \frac{\Delta\beta'}{D} = 56 \text{ nm} \quad (18)$$

Accordingly, for compressed pulses having a width of 40 fs (but emitted by the central terminal 1 with a width of 1 ps), a wavelength shift of 56 nm is achieved between the two replicas $W_{12}$ and $W_{11}$ of the spectrum of the pulse.

A shift of 28 nm is obtained relative to the single length $\lambda_0$ of the incident pulses after approximately 8 m of fiber in total (including the 6.65 m necessary for compressing the pulses).

For example, if the optical transmission system includes 40 client (or subscriber) terminals with a bit rate of 1 Gbps per terminal, then by considering 40 judiciously distributed peak frame power values up to 76 W (18.4 dBm), it is possible to distribute 40 downlink wavelengths (transmitted to 40 client terminals) over a band of approximately 30 nm, i.e. approximately one wavelength every 100 GHz. The power limit is therefore given by the power of the fundamental or first order soliton.

The output power of each client terminal is chosen so that the soliton trapping effect on the uplink converts the wavelength of the pulses emitted by each client terminal to a single target wavelength. Note that the amplitude of the pulses emitted by each client terminal is adjusted beforehand, during an initial optical network configuration step.

Moreover, crosstalk between different generated WDM channels (or different wavelengths) is not significant given the compression of the spectrum that is generated in the standard fiber connecting the central terminal 1 to the client terminals. Non-soliton propagation over a few meters of ultra-short (here 40 fs) pulses in a standard fiber (dispersion D=17 ps/nm/km, dispersion length of the fundamental soliton $Z_D$=2.4 cm, mean power of the fundamental soliton $P_0$=42.4 dBm) widens the pulses in the time domain (by destabilizing "soliton" propagation), which is reflected in the frequency domain by compression of the spectrum such that no significant crosstalk is observed in the demultiplexer.

In contrast, a chromatic dispersion compensation module must be provided upstream of the demultiplexer 7 to compensate the cumulative chromatic dispersion along the path between the central terminal 1 and the client terminals.

It is nevertheless not necessary to revert to the exact width of the initial pulses (i.e. 40 fs), because the bit rate perceived by the client terminals is only 1 Gbps (which corresponds to a bit period equal to 1 ns). Returning the pulses to their bit period with a half-amplitude width less than half the bit period (i.e. 500 ps) is more than sufficient. The tolerance on the length of fiber compensating the standard single mode fiber (SSMF) is approximately 1 km. Thus if the central office to subscriber distance is 20 km, compensating only 19 km of SSMF suffices to return the pulse to within the bit period with a sufficiently small width for the photodetector to be able to resolve it.

The above numerical example shows the efficacy of the soliton trapping effect for spectrally demultiplexing a stream of data at 40 Gbps.

Thus the invention has the advantage that it reconciles the two types of passive optical network architecture. In other words, the central terminal 1 transmits a single wavelength $\lambda_0$ and a low-loss optical demultiplexer 7 is provided in the network 3 so that each client (or subscriber) terminal 11, 12 or 13 is associated with a wavelength $\lambda_1$, $\lambda_2$ or $\lambda_3$ that is specific to it and on which data $D_1$, $D_2$ or $D_3$ for it is carried.

Conversion in accordance with the invention based on the soliton trapping effect limits the length of fiber to a few meters with a standard passive optical network architecture with 40 subscribers. According to the above numerical example, a total of approximately 8 m of fiber is sufficient (including the 6.65 m necessary for compressing the pulses). This has the advantage of producing compact, entirely passive converters that are simple to fabricate at low cost.

Figure 4:
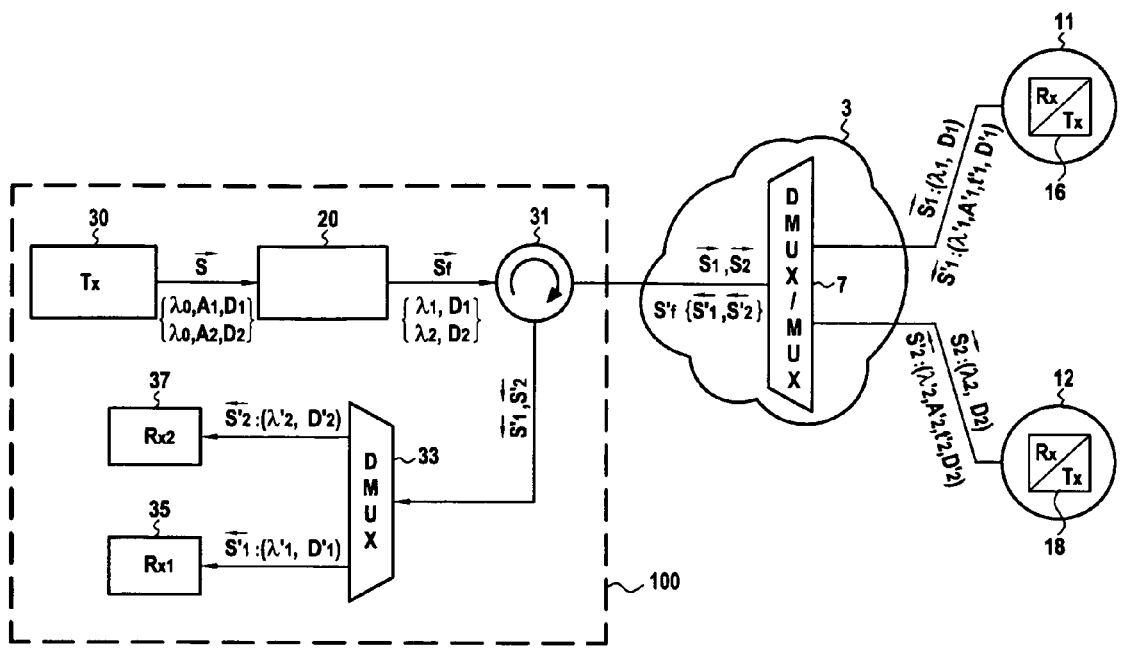
FIGS. 4 and 5 show two embodiments of an optical transmission system of the invention.
Figure 5:
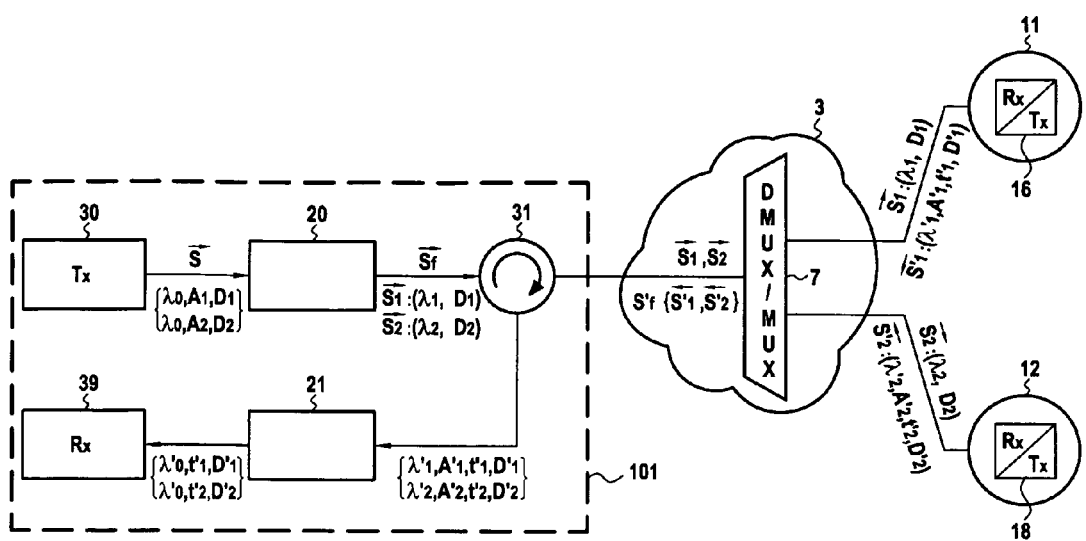

FIGS. 4 and 5 show two embodiments of the central terminal 101, 100 of the invention in a bidirectional optical transmission system comprising two client terminals 11 and 12, for example. In these two embodiments, the central terminal 100, 101 is itself a bidirectional terminal (i.e. a full-duplex terminal) in the sense that it can manage downlink and uplink data streams simultaneously.

In these two embodiments, the optical transmission central terminal 100, 101 includes a transmitter 30 for transmitting downlink data $D_1$, $D_2$ on the downlink to a plurality of client terminals 11, 12 during a downlink transmission stage. The central terminal 100, 101 further includes one or more receivers for receiving uplink data $D'_1$, $D'_2$ transmitted on the uplink by the plurality of client terminals 11, 12.

The expression "downlink" refers below to the communication link of the system by which downlink data $D_1$, $D_2$ is transmitted from the central terminal 100, 101 to the plurality of client terminals 11, 12 during a downlink transmission stage.

Conversely, the expression "uplink" refers to the communication link of the system whereby uplink data $D'_1$, $D'_2$ is transmitted from the plurality of client terminals 11, 12 to the central terminal 100, 101 during an uplink transmission stage.

Downlink Transmission Stage

During a transmission step, the central terminal 100, 101 transmits to a plurality of client terminals 11, 12 downlink data $D_1$, $D_2$ carried by an optical signal S of single wavelength $\lambda_0$ multiplexed in both amplitude and time. The optical signal S consists of a plurality of soliton pulses having a plurality of amplitudes. In the examples shown in FIGS. 4 and 5, the signal S consists of a first series of pulses of amplitude $A_1$ (data $D_1$) and a second series of pulses of amplitude $A_2$ (data $D_2$).

During a conversion step, the optical converter 20 converts the single wavelength $\lambda_0$ of the downlink optical signal S into two different wavelengths $\lambda_1$ and $\lambda_2$ as a function of the amplitudes $A_1$ and $A_2$ to form a wavelength division multiplexed downlink optical signal $S_f$ carrying the downlink data $D_1$ and $D_2$ at the respective wavelengths $\lambda_1$ and $\lambda_2$.

During a routing step, the wavelength division multiplexed downlink optical signal $S_f$ is routed to the plurality of client terminals 11, 12 by routing means consisting of a WDM optical circulator 31 between the optical converter 20 and the optical network 3.

On the downlink:
  $S_1$ is the spectral component of the wavelength division multiplexed signal $S_f$ carrying the downlink data $D_1$ at the wavelength $\lambda_1$ intended for the client terminal 11; and
  $S_2$ is the spectral component of the wavelength division multiplexed signal $S_f$ carrying the downlink data $D_2$ at the wavelength $\lambda_2$ intended for the client terminal 12.

During a wavelength division demultiplexing step, the wavelength division multiplexed downlink optical signal $S_f$ is spectrally demultiplexed so that each client terminal 11, 12 can receive the data intended for it ($D_1$, $D_2$, respectively) at a specific wavelength ($\lambda_1$, $\lambda_2$ respectively). For this purpose, optical demultiplexing means consisting of a WDM optical demultiplexer 7 are disposed in the optical network 3 between the WDM circulator 31 and the plurality of client terminals 11, 12.

The client terminals 11 and 12 each include a respective receiver module or receiver 16, 18 for receiving data carried by the spectral components $S_1$, $S_2$ of the downlink optical signal $S_f$. Thus the downlink data $D_1$ (respectively $D_2$) carried by the spectral component $S_1$ (respectively $S_2$) at the wavelength $\lambda_1$ (respectively $\lambda_2$) is routed to the client terminal 11 (respectively 12) by an optical link and demodulated by the receiver 16 (respectively 18) of the client terminal 11 (respectively 12).

Uplink Transmission Stage

On the uplink (from the client terminals 11 and 12 to the central terminal 100 or 101), $S'_1$ (respectively $S'_2$) designates the optical signal emitted by the transmitter 16 (respectively 18) of the client terminal 11 (respectively 12) carrying the uplink data $D'_1$ (respectively $D'_2$) at the wavelength $\lambda'_1$ (respectively $\lambda'_2$) intended for the central terminal 100 or 101.

During a step of transmission on the uplink, each client terminal 11, 12 transmits uplink data $D'_1$, $D'_2$ to the central terminal 100, 101. The uplink optical signal $S'_1$ (respectively $S'_2$) is transmitted at a specific amplitude $A'_1$ (respectively $A'_2$) and with a predetermined time shift $t'_1$ (respectively $t'_2$).

During a wavelength division multiplexing step, the uplink optical signals $S'_1$ and $S'_2$ are wavelength division multiplexed by a WDM multiplexer 7 (multiplexing means) to form a wavelength division multiplexed uplink optical signal $S'_f$. Note that this WDM multiplexer 7 and the WDM demultiplexer 7 used for the downlink consist of a single component acting both as a multiplexer and a demultiplexer.

During a routing step, the wavelength division multiplexed uplink optical signal $S'_f$ is routed by the optical circulator 31 to one or more receivers for receiving the uplink data $D'_1$ and $D'_2$ transmitted by the client terminals 11 and 12, respectively.

First Embodiment

FIG. 4 shows a first embodiment of a bidirectional optical transmission system comprising an uplink and a downlink using the uplink and downlink transmission stages described above and in which the central terminal 100 comprises a receive demultiplexer 33 (second demultiplexing means), two data receivers 37 and 35 connected to the receive demultiplexer 33, and the circulator 31, which is disposed between the converter 20 and the receive demultiplexer 33.

During a demultiplexing step of the uplink transmission stage, the wavelength division multiplexed uplink optical signal $S'_f$ is spectrally demultiplexed by the receive demultiplexer 33 to distribute the spectral components $S'_1$, $S'_2$ to first and second data receivers 35, 37, respectively.

During a reception step, the first data receiver 35 and the second data receiver 37 receive the uplink data $D'_1$ and the uplink data $D'_2$, respectively, carried by the uplink optical signals $S'_1$ and $S'_2$, respectively, on respective wavelengths.

Thus the central terminal 100 receives the data $D'_2$ and $D'_1$ following wavelength division demultiplexing of the signals $S'_1$ and $S'_2$ by the receive demultiplexer 33.

Note that, in the FIG. 4 example, conversion of the optical signal S multiplexed in both amplitude and time into a wavelength division multiplexed optical signal $S_f$ concerns the downlink optical signals $S_1$, $S_2$.

However, to minimize the number of uplink data receivers in the central terminal 100, the wavelength division multiplexed uplink optical signal $S'_f$ can be converted into an optical time domain multiplexed (OTDM) signal using an additional optical converter 21 based on the soliton trapping effect, as shown in a second embodiment in FIG. 5.

Second Embodiment

In the second embodiment shown in FIG. 5, the central terminal 101 comprises:
the transmitter 30, the optical circulator 31;
a first optical converter 20 of the invention, between the transmitter 30 and the optical circulator 31;
a data receiver 39 connected to the second converter 21; and
a second optical converter 21 of the invention, between the data receiver 39 and the optical circulator 31.

After it has been routed by the optical circulator 31, the wavelength division multiplexed uplink optical signal $S'_f$ is injected into the second optical converter 21, which in a step of conversion by the non-linear soliton trapping effect converts it into a time division multiplexed uplink signal on a single wavelength $\lambda'_0$ carrying the uplink data $D'_1$, $D'_2$.

As in the downlink transmission stage, the non-linear optical means of the second converter 21 consist of a polarization-maintaining birefringent fiber 5. The conversion step of the uplink transmission stage is then effected by injecting the wavelength division multiplexed uplink optical signal $S'_f$ at 45° to the proper axes of a polarization-maintaining birefringent fiber 5.

The effect of the second converter 21 is to lock the two channels carried by the wavelengths $\lambda'_1$ and $\lambda'_2$ onto a single uplink wavelength $\lambda'_0$, the value of which is, for example, made slightly higher than that of the wavelength $\lambda_0$ used in the downlink direction in order to prevent interference between the uplink and the downlink.

In each client terminal 11, 12, it is naturally necessary to transmit power frames such that the wavelengths $\lambda'_1$ and $\lambda'_2$ can be locked successfully to the single uplink wavelength $\lambda'_0$.

During a reception step, the uplink signal at the single wavelength $\lambda'_0$ supplied at the output of the second optical converter 21 is demodulated by a single receiver 39 to recover the uplink data $D'_1$, $D'_2$ on two different channels.

The advantage of this second embodiment is that only one receiver 39 is needed in the central terminal 101, provided that fine synchronization is effected on transmitting the uplink signals $S'_1$, $S'_2$ so that these signals are interleaved correctly in the time domain. In other words, on transmission, each signal $S'_1$, $S'_2$ must be transmitted with a time shift $t'_1$ and $t'_2$ such that the signal obtained at the output of the second optical converter 21 following conversion by the soliton trapping effect is an optical time domain multiplexed (OTDM) signal.

The invention claimed is:

1. A method of optical transmission between a central terminal and a plurality of client terminals via an optical network, said method being characterized in that it comprises a downlink transmission stage for transmitting downlink data ($D_1$, $D_2$) and an uplink transmission stage for transmitting uplink data ($D'_1$, $D'_2$), said downlink transmission stage comprising the steps of:
said central terminal transmitting a downlink optical signal (S) which is multiplexed in both amplitude and time, at a single wavelength ($\lambda_0$), and carrying the downlink data ($D_1$, $D_2$) to be received by said plurality of client terminals, said downlink optical signal (S) at a single wavelength ($\lambda_0$) consisting of soliton pulses having a plurality of amplitudes ($A_1$, $A_2$);
using a non-linear soliton trapping effect to convert said single wavelength ($\lambda_0$) of said downlink optical signal (S) into a plurality of wavelengths ($\lambda_1$, $\lambda_2$) as a function of said plurality of amplitudes ($A_1$, $A_2$) to form a wavelength division multiplexed downlink optical signal ($S_f$);
said central terminal routing the wavelength division multiplexed downlink optical signal ($S_f$) to said plurality of client terminals; and
wavelength division demultiplexing said wavelength division multiplexed downlink optical signal ($S_f$) so that each client terminal receives the data ($D_1$, $D_2$) intended for it at a specific wavelength ($\lambda_1$, $\lambda_2$).

2. The method of optical transmission according to claim 1, wherein said uplink transmission stage comprises the steps of:
transmitting a plurality of uplink optical signals ($S'_1$, $S'_2$) to said central terminal, each uplink optical signal carrying the respective uplink data ($D'_1$, $D'_2$) at a different wavelength ($\lambda'_1$, $\lambda'_2$) and being transmitted by a respective client terminal from said plurality of client terminals with a specific amplitude ($A'_1$, $A'_2$) and a predetermined time shift ($t'_1$, $t'_2$);
wavelength division multiplexing said plurality of uplink optical signals ($S'_1$, $S'_2$) to form a wavelength division multiplexed uplink optical signal ($S'_f$); and
routing said wavelength division multiplexed uplink optical signal ($S'_f$) to one or more receivers for receiving the data ($D'_1$, $D'_2$) transmitted by each client terminal of said plurality of client terminals.

3. The optical transmission method according to claim 1 further comprising a step of temporal compression of said soliton pulses before said conversion step.

4. The optical transmission method according to claim 2, wherein said uplink transmission stage further comprises:
a wavelength division demultiplexing step in which the wavelength division multiplexed uplink optical signal ($S'_f$) is spectrally demultiplexed into a plurality of spectral components; and
a step of reception of the uplink data by a plurality of receivers during which each of said spectral components carrying uplink data transmitted by a client terminal on a respective wavelength is received by a receiver from said plurality of receivers.

5. The optical transmission method according to claim 2, wherein said uplink transmission stage further comprises:
a conversion step during which said wavelength division multiplexed uplink optical signal ($S'_f$) is converted by a non-linear soliton trapping effect into a time division multiplexed uplink signal at a single wavelength ($\lambda'_0$) carrying the uplink data; and a step of a single receiver receiving the uplink signal at a single wavelength ($\lambda'_0$).

6. The optical transmission system linking a central terminal and a plurality of client terminals via an optical network, said central terminal being adapted to transmit downlink data ($D_1$, $D_2$) on a downlink to said plurality of client terminals and to receive uplink data ($D'_1$, $D'_2$) on an uplink from said plurality of client terminals, wherein said system comprises on the downlink:

means for transmitting a downlink optical signal (S) at a single wavelength ($\lambda_0$) and carrying said downlink data ($D_1$, $D_2$), said downlink optical signal (S) being multiplexed in both amplitude and time and consisting of soliton pulses having a plurality of amplitudes ($A_1$, $A_2$);

nonlinear means for converting by a soliton trapping effect said single wavelength ($\lambda_0$) of said downlink optical signal (S) into a plurality of wavelengths ($\lambda_1$, $\lambda_2$) as a function of said plurality of amplitudes ($A_1$, $A_2$) to form a wavelength division multiplexed downlink optical signal ($S_f$);

routing means for routing the wavelength division multiplexed downlink optical signal ($S_f$) to said plurality of client terminals; and first demultiplexing means for spectrally demultiplexing said downlink optical signal ($S_f$) so that each client terminal receives the downlink data ($D_1$, $D_2$) for it on a specific wavelength ($\lambda_1$, $\lambda_2$).

7. The system of optical transmission according to claim 6, further comprising on the uplink:

means for transmitting a plurality of uplink optical signals ($S'_1$, $S'_2$) to said central terminal, each uplink optical signal carrying the respective uplink data ($D'_1$, $D'_2$) at a different wavelength ($\lambda'_1$, $\lambda'_2$) and being respectively transmitted by a client terminal of said plurality of client terminals with a specific amplitude ($A'_1$, $A'_2$) and with a predetermined time shift ($t'_1$, $t'_2$);

multiplexing means for wavelength division multiplexing said plurality of uplink optical signals ($S'_1$, $S'_2$) to form a wavelength division multiplexed uplink optical signal ($S'_f$);

means for routing said wavelength division multiplexed uplink optical signal ($S'_f$); and one or more receivers for receiving the data ($D'_1$, $D'_2$) transmitted by each client terminal of said plurality of client terminals.

8. The system according to claim 7, further comprising on the uplink:

second demultiplexing means for spectrally demultiplexing the wavelength division multiplexed uplink optical signal ($S'_f$) into a plurality of spectral components; and a plurality of receivers at the output of said second demultiplexing means each adapted to receive uplink data carried by each spectral component and transmitted by a client terminal on a respective wavelength.

9. The system according to claim 7, further comprising on the uplink:

non-linear means for converting by a soliton trapping effect the wavelength division multiplexed uplink optical signal ($S'_f$) into a time division multiplexed uplink signal at a single wavelength ($\lambda'_0$) carrying the uplink data; and means for receiving said uplink signal at a single wavelength ($\lambda'_0$).

10. The system according to claim 7, further comprising temporal compression means upstream of said non-linear means for compressing said soliton pulses.

11. The system according to claim 6, wherein said optical network is an access passive optical network.

12. An optical transmission central terminal comprising:

a transmitter for transmitting downlink data ($D_1$, $D_2$) to a plurality of client terminals, said downlink data being carried by a downlink optical signal (S) at a single wavelength ($\lambda_0$) comprising a plurality of soliton pulses, said downlink optical signal (S) being multiplexed in both amplitude and time and having a plurality of amplitudes ($A_1$, $A_2$);

one or more receivers for receiving uplink data ($D'_1$, $D'_2$) transmitted by said plurality of client terminals;

said central terminal being characterized in that it further comprises:

routing means for routing downlink and uplink data; and a first optical converter between the transmitter and the routing means, said first optical converter comprising non-linear means for converting by a soliton trapping effect a single wavelength ($\lambda_0$) of said downlink optical signal (S) into a plurality of wavelengths ($\lambda_1$, $\lambda_2$) as a function of said plurality of amplitudes ($A_1$, $A_2$) so as to form a wavelength division multiplexed downlink optical signal ($S_f$).

13. The terminal according to claim 12, comprising a receive demultiplexer and a plurality of receivers for receiving the uplink data ($D'_1$, $D'_2$), each of said receivers being connected to said receive demultiplexer, and said routing means are disposed between said first non-linear means and said receive demultiplexer.

14. The terminal according to claim 12, further comprising a data receiver and a second optical converter located between said routing means and said data receiver and comprising non-linear means.

* * * * *

UNITED STATES PATENT AND TRADEMARK OFFICE
CERTIFICATE OF CORRECTION

PATENT NO.         : 8,611,746 B2                                    Page 1 of 1
APPLICATION NO.    : 12/087027
DATED              : December 17, 2013
INVENTOR(S)        : Pincemin et al.

It is certified that error appears in the above-identified patent and that said Letters Patent is hereby corrected as shown below:

In the Specification

In column 2 at line 30, Change "to the" to --to an embodiment of the--.

In column 4 at line 22, Change "The" to --A--.

In column 4 at line 22, Change "to the" to --to an embodiment of the--.

In column 5 at line 57, After "system" insert --to an embodiment of the--.

In column 5 at line 63, Change "The" to --Another aspect of the--.

In column 5 at line 63, Change "is also" to --is--.

Signed and Sealed this
Twenty-second Day of July, 2014

Michelle K. Lee
*Deputy Director of the United States Patent and Trademark Office*